(No Model.)

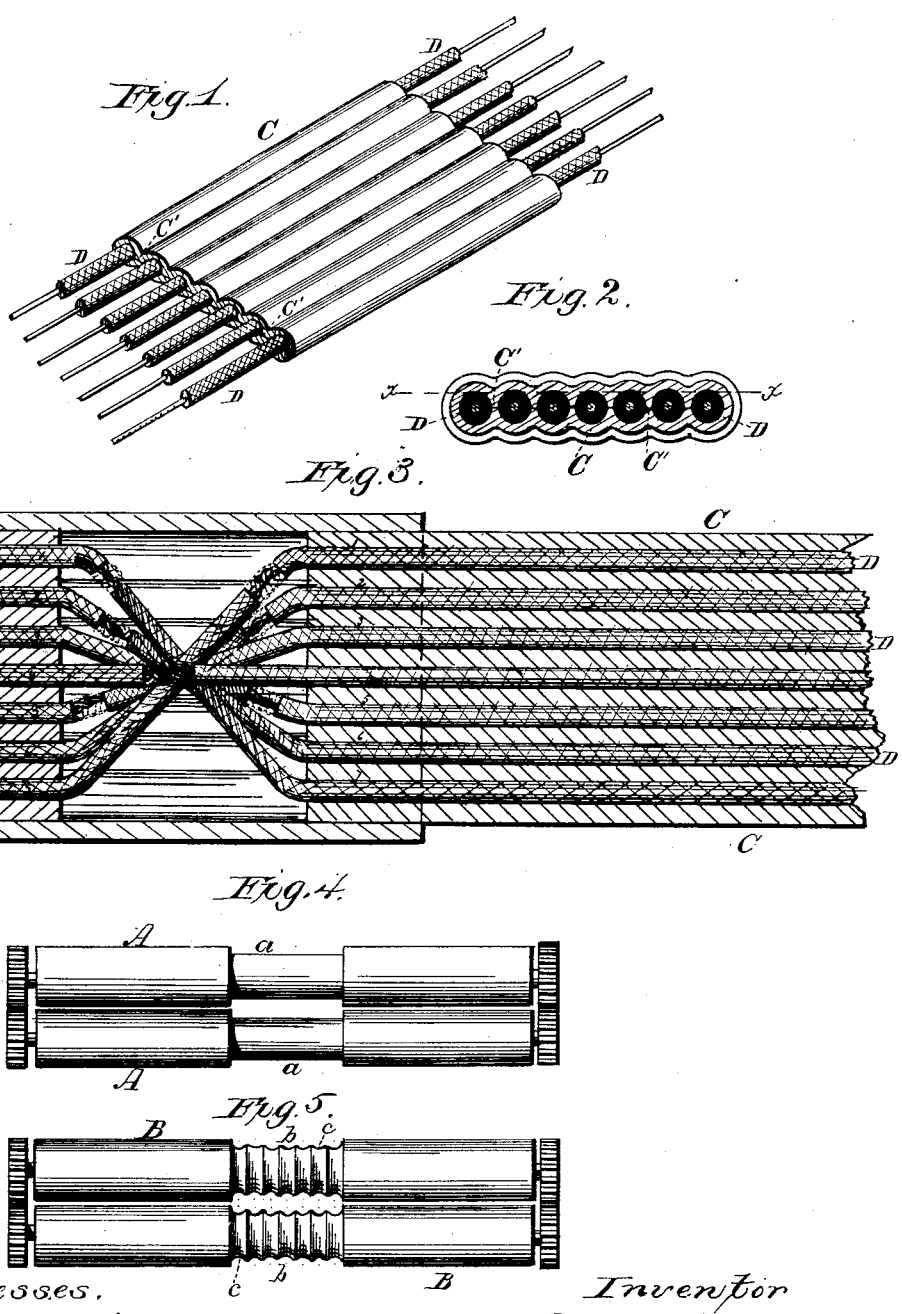

2 Sheets—Sheet 2.

P. B. DELANY.
Electric Cable.

No. 242,894.

Patented June 14, 1881.

Witnesses.
P. L. Ourand
W. B. Hale

Inventor
P. B. Delany
By Fred W. Royce
Attorney

UNITED STATES PATENT OFFICE.

PATRICK B. DELANY, OF NEW YORK, N. Y.

ELECTRIC CABLE.

SPECIFICATION forming part of Letters Patent No. 242,894, dated June 14, 1881.

Application filed May 9, 1881. (No model.)

*To all whom it may concern:*

Be it known that I, PATRICK B. DELANY, a citizen of the United States of America, residing at New York, in the county of New York and State of New York, have invented certain new and useful Improvements in Electric Cables; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of electric cables in which a plurality of conducting-wires are inclosed in a lead pipe, its object being to prevent induction of the wires upon each other, to enable the cable to be readily reeled or bent for any other purpose without damage to the pipe, displacement of the wires, or interference with their insulation, and to facilitate the manufacture, reduce the cost, and promote the durability of cables of this class.

Figure 6:
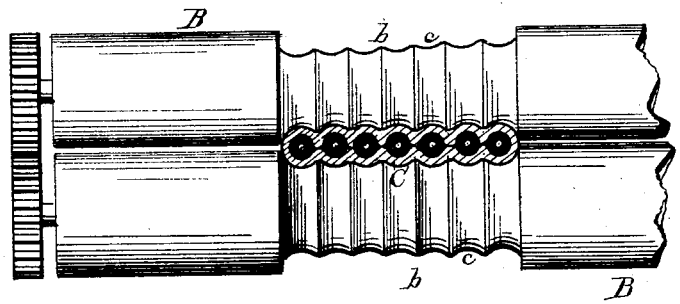
Figure 7:
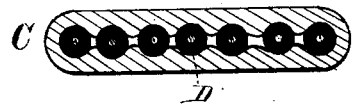

In the accompanying drawings, Figure 1 is a perspective view of a portion of an electric cable constructed according to my invention. Fig. 2 is a cross-section of the same. Fig. 3 is a longitudinal section on the dotted line $xx$ of Fig. 2. Fig. 4 is a front view of a pair of rollers for reducing an ordinary commercial lead pipe to an oblong cross-section to receive the wires, the pipe being shown in sections. Fig. 5 is a similar view of a pair of rollers for corrugating the flattened pipe and pressing its opposite sides between the wires. Fig. 6 shows the cable in cross-section as passing between said rollers. Fig. 7 is a cross-section of a modification of the cable, in which the corrugations of the pipe are omitted.

There are several modes by which my improved cable may be manufactured. In one mode I first take any desired length of ordinary commercial lead pipe of proper size, and flatten or reduce it to an oblong cross-section by passing it between metal rollers having peripheral recesses, as shown in Fig. 4, in which A indicates the rollers, and $a$ the peripheral recesses therein. These recesses serve to guide the pipe and maintain it in uniform shape, their joint depth being equal to the thickness the flattened pipe is to have, and the distance between the inner surfaces of the flattened walls of the pipe being equal to the diameter of the covered wires which are to be introduced into said pipe. After flattening the pipe so that it will snugly receive the covered wires which are to form the conductors of the cable, I draw into said pipe, by any of the usual and suitable means, as many covered wires, side by side, as it will hold. I then pass the pipe so filled with wires between two other rollers, such as shown at B in Fig. 5. These rollers have recesses $b$, the bottoms of each of which are composed of parallel grooves, as shown at $c$. Said recesses are of such depth, and the ribs separating the grooves of such height that the pipe is tightly compressed upon the covered wires and its opposite side walls forced between them, meeting and being closely pressed together to form practically continuous leaden walls separating said wires. The cross-section of the cable thus formed is shown in Fig. 2, in which the letter C indicates the lead pipe, the letter D the wires, and $C'$ the leaden walls which separate the wires, and are formed by the compression of the pipe, as before described, forming a solid air-tight cable.

Instead of first flattening a round lead pipe I may manufacture a lead pipe having originally an oblong cross-section, by means of a pipe-press having a suitably-formed die and mandrel; and, again, I may discard the rollers, use an originally flattened pipe, and subject the same to hydraulic pressure flatwise, which will have the effect of forcing the flat side walls of the pipe between the wires and compressing the coverings. The walls need not meet and actually touch between the wires, though I prefer that they should do so; or I may manufacture a corrugated pipe and introduce the wires into the same through a hollow mandrel of the pipe-press simultaneously with the formation of the pipe, as is now done in the manufacture of round cables, and afterward pass the cable between suitable rollers, or subject it to hydraulic pressure to compress the pipe upon the wires.

In joining two sections of my improved cable I first slip over the end of one of the sections a lead sleeve of corresponding shape and then cross-connect the wires of the two sections, as shown in Fig. 3, in which the wire 1 of one section is spliced with wire 7 of the other section, wire 2 with wire 6, and wire 3 with wire 5, the contiguous parallelism of these currents over these wires being thus destroyed at intervals, the central wire, 4, being next to no other wire for a greater distance than the length of one section of the cable. By this arrangement of the wires, as will be observed, they are placed in such relation to each other that induction of continuous currents by one wire upon another would be prevented in a great degree, even were there no other prevention. The cross-connections being made the sleeve is slipped over the joint and soldered to both sections.

It is well known that if a conductor of suitable area be interposed between two other parallel conductors it will intercept the induction of the two outer conductors and thus prevent them from inducing upon each other. The leaden walls C', therefore, which are interposed between the wires, intercept the induction of the wires toward each other, taking up the induced currents, which will pass to the ground if the cable is embedded in the earth as an underground cable, or over suitable ground-wires, which may be used at intervals to connect the pipe with the earth, if the cable is arranged overground. The flat form of the cable gives it great flexibility in one direction, and it may also be easily given a half-twist in order that it may be bent to change direction at an angle to that in which a previous portion of the cable has been laid flatwise in a different plane. The compression of the pipe upon the wires and the formation of the intermediate walls give the cable a great tensile as well as lateral strength, and as the wires are all in the same plane throughout each section and thoroughly separated and supported by surrounding walls of lead, they cannot possibly interfere with each other however the cable may be bent.

It will further be observed that I am enabled to place a large number of wires in a single pipe, and at the same time dispense with the usual fusible insulating substances which have heretofore been necessarily used to maintain the wires in position and insulate them from each other in cables of this class.

As there is no heat nor cooling necessary, and the apparatus is extremely simple, my improved cable can be manufactured with great rapidity, and the separate elements may be transported to the place where the cable is to be laid and there combined into a cable by unskilled workmen.

Having now described my invention, what I claim is—

1. An electric cable composed of a series of insulated wires in the same plane and inclosed by a close-fitting flat flexible lead pipe, substantially as described.

2. An electric cable composed of a series of insulated wires in the same plane, inclosed by a flexible lead pipe and separated by walls of a conducting material, substantially as described.

3. An electric cable composed of a series of insulated wires in the same plane and inclosed in a flexible lead pipe, opposite walls of which extend and meet between the said wires, substantially as described.

4. An electric cable composed of a series of insulated wires in the same plane and inclosed in a flexible lead pipe, portions of the opposite walls of which project toward each other, between the said wires, substantially as described.

5. The method of forming an electric cable, substantially as herein described, the same consisting in introducing the covered wires into a lead pipe and then compressing the pipe and forcing opposite portions of the wall thereof between the said wires, substantially as described.

PATRICK B. DELANY.

Witnesses:
EDWIN F. COREY,
JOSEPH M. BULGER.